United States Patent [19]
Fasching et al.

[11] 3,747,001
[45] July 17, 1973

[54] PULSE PROCESSING SYSTEM

[75] Inventors: George E. Fasching; George H. Patton, both of Morgantown, W. Va.

[73] Assignee: The United States of America as represented by the United States Atomic Energy Commission, Washington, D.C.

[22] Filed: Feb. 17, 1972

[21] Appl. No.: 227,172

[52] U.S. Cl. .................. 328/116, 328/41, 328/104, 328/115
[51] Int. Cl. ............................................. H03k 5/20
[58] Field of Search .................. 307/265, 266, 267; 328/58, 14, 41, 104, 115, 116

[56] References Cited
UNITED STATES PATENTS

| | | | |
|---|---|---|---|
| 2,786,100 | 3/1957 | Earp | 328/14 |
| 2,854,577 | 9/1958 | Torode | 328/127 |
| 2,973,509 | 2/1961 | Majerus et al. | 328/61 |
| 3,044,065 | 7/1962 | Barney | 328/41 |
| 3,324,241 | 6/1967 | Bachelet | 179/8 |
| 3,603,888 | 9/1971 | Jones | 328/116 |

OTHER PUBLICATIONS

Blatt et al., "Elimination of Pulse Pileup Distortion in Nuclear Radiation Spectra," Nuclear Instruments & Methods, Vol. 60, 1968, No. 2, pages 221–230.

Primary Examiner—John W. Huckert
Assistant Examiner—Ro E. Hart
Attorney—Roland A. Anderson

[57] ABSTRACT

A pulse counting system with improved energy resolution is disclosed having dual channels for pulse processing at different rates and a pulse pileup detector to select which channel is utilized. Pulse input is delayed until the pileup detector can determine if any pulse is so closely followed in time by a second pulse to constitute pulse pileup. If no pulse pileup is detected, the slower channel is selected. The slow channel clips the pulse to a relatively wide pulse width to retain good energy resolution. If pulse pileup is predicted, the fast channel with correspondingly shorter pulse width is selected to improve resolution in respect to time. The output of the two channels are transmitted to a pulse height analyzer for interpretation.

9 Claims, 5 Drawing Figures

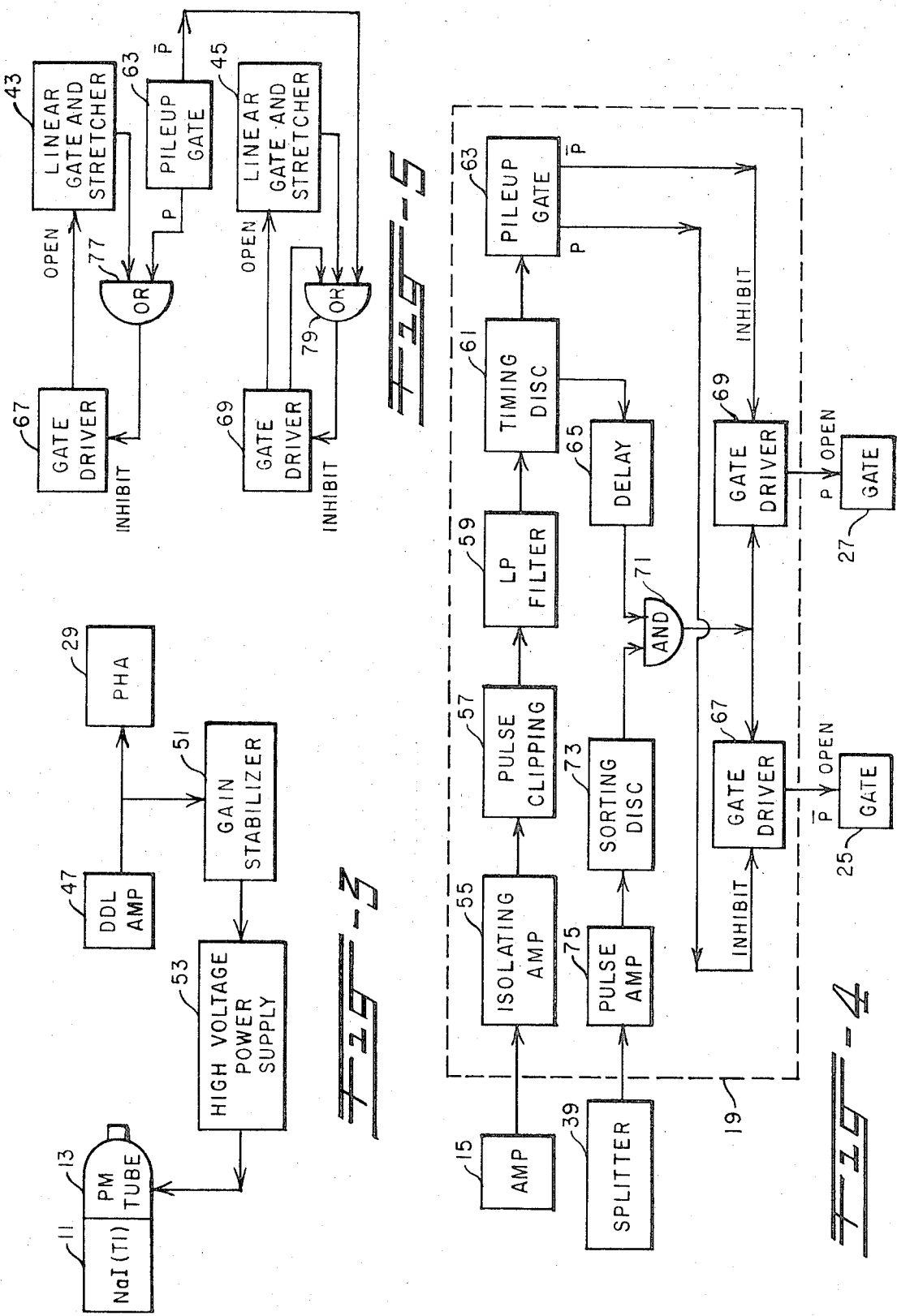

PULSE PROCESSING SYSTEM

BACKGROUND OF THE INVENTION

This invention was made in the course of, or under, a contract with the United States Atomic Energy Commission.

FIELD OF THE INVENTION

This invention relates to pulse counting systems used, for example, to identify and determine the amount of various elements in a sample or a process stream. Gamma radiation, emitted from a radioisotope or upon neutron capture by an atom, will be at an energy characteristic of the element. Pulse height analysis of signals generated by gamma radiation can identify elements within the sample and determine the amount of a contained element from the pulse energy and pulse count at that energy. Consequently good energy resolution is of primary importance in the development of accurate pulse counting systems.

Energy resolution capability varies in different gamma radiation detectors. For instance, a lithium drifted germanium detector, Ge(Li), is a more precise instrument in this respect than a thalium doped sodium iodide, NaI(T1), detector. However, it is often desirable, especially in industrial field applications, to select the less precise instrument because of difficulties in cooling and handling the Ge(Li detector. The present development is an improved pulse processing system that is particularly applicable in enhancing the energy resolution of a less precise detector such as the NaI(T1).

The present devlopment has use, for instance, in determining the sulfur content of fossil fuels. By way of example, a rugged NaI(T1) gamma radiation detector in conjunction with a neutron source such as californium-252 can be installed within a coal processing system and thereby continuously monitor the sulfur content of coal. On neutron capture from the californium-252 source, sulfur emits prompt gamma radiation that can be monitored by the NaI(T1) detector to determine the amoutn of sulfur within a sample stream.

DESCRIPTION OF PRIOR ART

In prior pulse counting systems, energy resolution in degraded when pulse pileup occurs, that is, when two or more pulses are received within the resolving time of the system. Consequently, the pulse amplitude or energy level measured by a pulse height analyzer does not properly represent any of the individual pulses present in the pileup.

The relationship between the total pulse count rate and the count rate of distinct pulses, that is pulses not involved in pileup, is given by the following expression:

$$N_1 = N_o e^{-N_o t}$$

where: $N_1$ is the distnct pulse count rate $N_o$ is the total pulse count rate $T$ is the pileup resolving time. This qunatity is a function of pulse width and is equal to pulse width for pure square wave input.

Applying this equation to a NaI(Ti) spectrometer generating a 0.5 microsecond pulse width at 300,000 counts per second, it is seen that 13.9 percent of the total pulse count is piledup. Pulse pileup of this magnitude can produce considerable distortion in pulse amplitude spectra. If the pulse width is substantially shortened to avoid pileup, for instance, to 300 nanoseconds or below, the signal to noise ratio becomes so low that good energy resolution cannot be obtained.

Several methods of obtaining improved energy resolution in radiation spectra by eliminating pulse pileup distortion have been given in the prior art. One method is basically to reject all pulses that are coincident within the time resolution of the pulse processing system. Consequently only the portion of the pulse input having no pileup is examined and it enters at a correspondingly lower count rate than the original pulse input. The procedure has the disadvantage that significant data may be discarded with the piledup portion of the pulse input.

Another prior art method of eliminating pileup distortion is that of pulse correction. Pulses that are coincident within the system time resolution are accepted and a pileup correction is applied to the pulse signal prior to analysis. The correction is generally obtained by sampling the pulse pileup just before or just after arrival into the system and thereby simulating an interferring pulse. The simulated pulse is then subtracted from the piledup pulse to obtain a modified pulse of interest. Often, however, a pileup may contain several pulses of interest embodying useful data for analysis. This particular correction procedure presents only one pulse of interest from each pileup array.

SUMMARY OF THE INVENTION

It is an object of the present invention to provide an improved pulse signal processing system for minimizing pulse pileup distortion.

It is a further object to provide a processing system that presents a high proportion of input pulse count for subsequent analysis.

It is also an object to provide a method of processing an input pulse signal to improve pulse energy resolution with a minimum of pulse count rejection.

In accordance with the present invention there is provided a pulse signal processing system and method for minimizing pulse pileup distortion. The system includes a pulse pileup detector that selects either a fast or a slow pulse processing channel depending on whether or not more than one input pulse is coincident within the resolving time of ths system. If pulse pileup is detected, the fast channel is selected; but, if not, the slow channel is employing in processing the pulse signal.

The slow channel clips each incoming pulse to an equal pulse width to achieve separation. The pulse width is sufficiently long to minimize energy resolution degradation after stretching and transmittal to a pulse height analyzer.

The fast channel is disposed in electrical parallel to the slow processing channel and shortens each incoming pulse to a shorter pulse width than the width produced in the slow channel. The fast channel thereby provides improved resolution in time to minimize pulse pileup distortion. The output of either the slow or the fast channel, as selected by the pileup detector, is transmitted to a pulse height analyzer for counting the number of pulses occurring at a particular pulse height or energy.

BRIEF DESCRIPTION OF THE DRAWINGS

The present invention is illustrated in the following drawings wherein:

FIG. 3 is a diagram of an additional feature that may be included in the pulse processing system of FIGS. 1 and 2.

FIG. 4 is block diagrm showing one arrangement of the pulse pileup detector in FIG. 1.

FIG. 5 is a diagram showing a detailed arrangement of the gate circuits in FIG. 4.

DETAILED DESCRIPTION OF THE PREFERRED EMBODIMENTS

Figure 1:
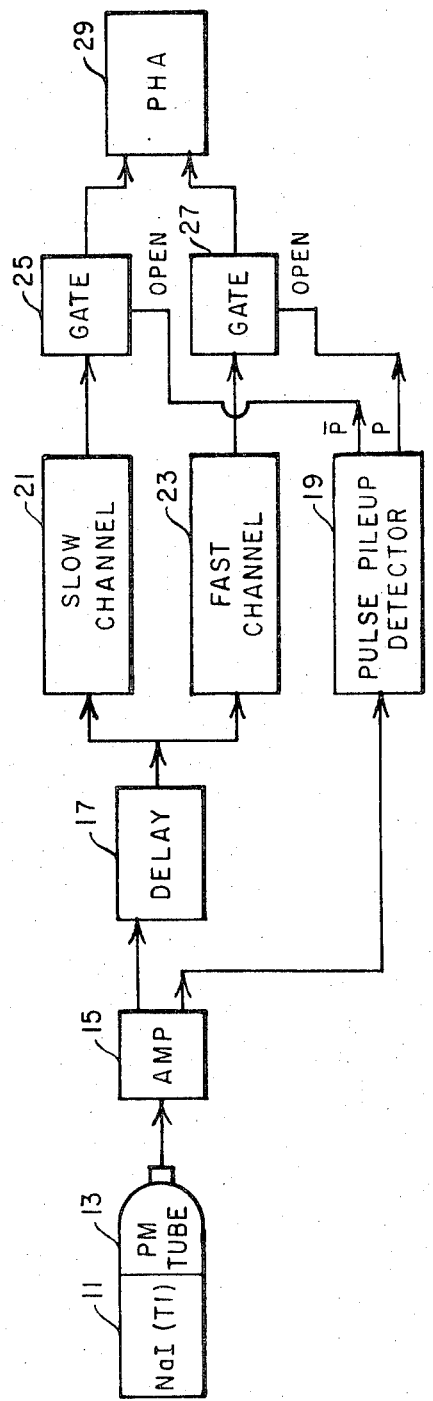
FIG. 1 is a diagrammatic representation of a pulse signal processing system as particularly applied to process nuclear radiation spectra.

The pulse processing system in FIG. 1 is shown associated with a NaI(T1) phosphor 11 and a photomultiplier tube 13 for generating a pulse signal representing nuclear radiation spectra. Other input pulse signals might equally well be processed in the present system. The pulse signal is supplied to a suitable amplifier 15 to increase the pulse amplitude to a useful value. The output of amplifier 15 is transmitted both to a deley circuit 17 and to a pulse pileup detector 19. The delay circuit is an ordinary electrical conductor of extended length that allows the pileup detector 19 to preexamine the pulse signal. The delay is of sufficient length to allow the pileup detector to retain each pulse longer than the limiting resolving time of the amplifiers within the system.

After delay 17, the pulse signal is transmitted in parallel to both slow pulse processing channel 21 and a fast pulse processing channel 23. The slow channel clips each pulse in the input signal to an equal pulse width to provide separation for operating the subsequent gate 25. However, each clipped pulse retains a sufficient length to adequately sample the input without undue degradation of energy resolution. The fast channel 23 clips the input pulse signal to a substantially shorter pulse width to resolve pileups of several pulses coincident within very short time intervals. Consequently, the pulse shaping within the fast channel may not permit energy resolution to the same degree of precision as in the slow channel.

The outputs from the slow 21 and fast channels 23 are controlled by gates 25 and 27 respectively in route to the pulse height analyzer 29. When no pulse pileup is detected, a signal from detector 19 opens or enables gate 25 to select the output of the slow channel 21. If pulse pileup is detected, gate 27 is enabled rather than gate 25 to select the outpt of fast channel 23. Suitable mixing circuits are included in or with the pulse height analyzer 29 to receive first one then the other of the fast and slow channels in rapid succession. The pulse height analyzer 29 is a conventional discriminator type device for resolving pulse height into energy spectra at various pulse count levels. One such device is a mutlichannel analyzer, model 5401B, available from Hewlett Packard, Monroeville, Pa.

The pulse pileup detector 19 receives the output of amplifier 15 in advance of the dual processing channels 21 and 23 and is thereby able to detect pulse pileup before the corresponding signal reaches the processing channels. Each pulse is stored in the pileup detector 19 for a longer interval than the clipped pulse width of the slow channel to ensure detection of pulse pileups within the duration of the slow channel pulse width. If a second pulse appears durin the storage interval, a signal (P) is transmitted to gate 27 indicating pileup. Conversely, if no second pulse appears during the interval, a signal ($\overline{P}$) is transmitted to enable gate 25 at the termination of the time interval.

Figure 2:
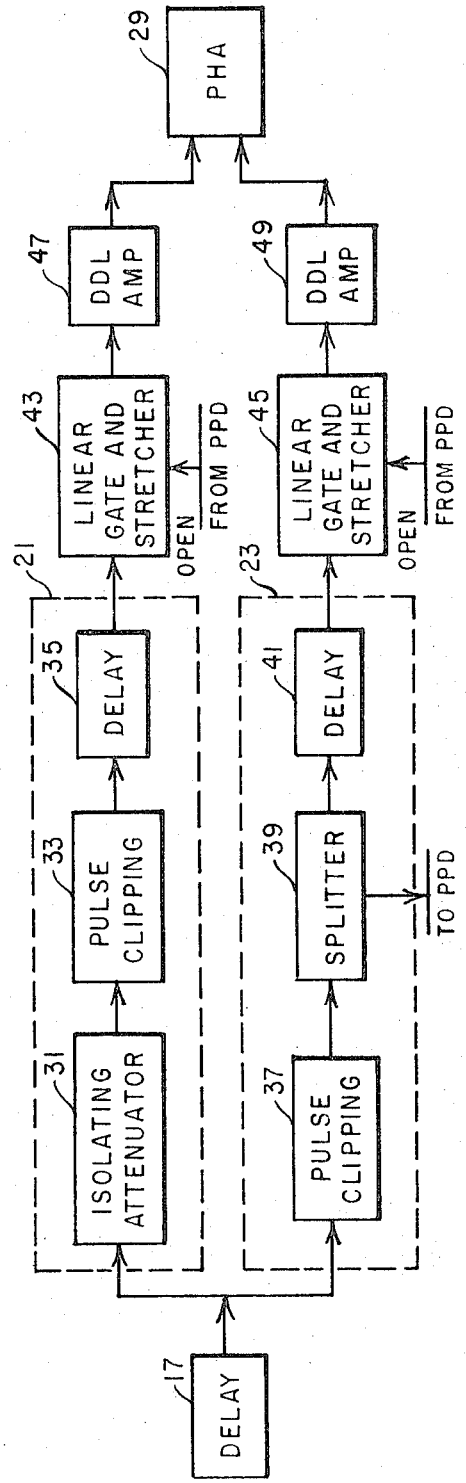
FIG. 2 is a block diagram showing a detailed embodiment of the two pulse processing channels of FIG. 1.

Referring now to FIG. 2, a more detailed representation of two pulse processing channels is illustrated. Each of the electronic components diagrammatically represented in FIG. 2 as well as in FIGS. 3, 4, and 5 are known to those skilled in the art and generally will not be described in great detail herein.

The output of delay circuitry 17 is transmitted to an isolating attenuator 31 within the slow channel 21. Attenuator 31 reflects back a high impedance to facilitate impedance matching throughout the system. Its output is connected to pulse clipping means 33 where each pulse is shortened to about 250 nanoseconds depending on the resolution capability of other components in the system. Pulse clipping may be accomplished, for example, with shorted delay lines or a resistor capacitor network having pole zero cancelation as required by the desired pulse width. A delay 35 is provided to synchronize the pulse processing channel output to the subsequent linear gate 43 with the control signal from the pulse pileup detector.

Fast channel 23 receives a parallel output from delay 17 into a second pulse clipping means 37. Here a pulse width of substantial shorter duration than that provided in the slow channel is produced. For example, a pulse width of about 50 nanoseconds may be sufficiently narrow to resolve much of the pulse pileup in a processing system as described herein. The short pulse is split and filterd in splitter 39 such that identical signals are transmitted to the pulse pileup detector and to delay circuitry 41. Splitter 39 is a resistive network of suitable design to match the impedance of the split load with that of the output from pulse clipping means 37. The signal transmitted to the pulse pileup detector will be discussed below in conjunction with FIG. 4. The other output of the splitter is synchronized in delay circuitry 41 with the control signal to linear gate 45.

Linear gate and stretcher devices 43 and 45 are components such as a diode bridge followed by an integrating circuit having a sufficient decay time. Suitable modules requiring slight modifications are available from EG&G, Inc., Salem, Mass., Model LG102/N. The gates are controlled by the output of the pulse pileup detector as previously described and the gate output is stretched or integrated to meet the input requirements of pulse height analyzer 29. An additional improvement in signal to noise ratio also results as the stretchers are basically LP filters. By way of example, the gate output may be stretched to about 250 nanosecond rise time and about 1 microsecond decay time constant.

The output of linear gates 43 and 45 are transmitted in parallel to separate double delay line amplifiers 47 and 49 respectively. A suitable DDL amplifier may be obtained from Nuclear-Chicago Corporation, Des Plaines, Ill., Model 30-31A. Within the DDL amplifiers, the signals are converted to bipolar pulses which settle to within about 1percent pulse height in about 2 microseconds. This conversion tends to reduce any pulse pileup that may have appeared in the stretchers. Moreover, the bipolar pulse is an advantageous form of input to pulse height analyzer 29 because no residual charge lingers in input capacitors. Therefore, a prompt return to the baseline or zero is facilitated between input pulses to anlayzer 29. The two amplifiers 47 and 49 are adjusted to provide consistent output in respect to gain and baseline levels from both the slow and fast channels.

FIG. 3 shows an arrangement for minimizing the effects of drift in the pulse input signal. The output signal from the slow channel double delay line amplifier 47 is monitored by a gain stablizer component 51. A spectrum stabilizer, Model 5586A available from Hewlett Packard, can be adapted for use as component 51. If changes in gain are detected, high voltage power supply 53 is approximately adjusted to compensate for the drift by varying the electrode voltage to the photomultiplier tube 13. Consequently, the gain produced in the photomultiplier tube 13 is corrected. The slow rather than the fast channel output is monitored because in most applications the slow channel is active for a major portion of the time and more accurately reflects the system gain than the fast channel.

FIG. 4 illustrates one suitable form of a pulse pileup detector 19. The output of amplifier 15 is received and further amplified by isolating amplifier 55 which also has a similar impedance matching function to that of isolating attenuator 31. The amplified pulse signal is clipped in pulse clipping means 57 to a pulse width of about the same duration as that achieved in the fast channel 23, that is, about 50 nanoseconds. A low pass filter 59 removes high frequency noise that may originate in photomultiplier tube 13 and attenuates outside interference from sources such as local commercial FM stations. The output from filter 59 is fed to a timing discriminator 61 having a threshold set at a low energy level to provide consistent timing for the gate control pulses. For instance, a threshold of about 0.5 MeV would be suitable in a sulfur analyzer. The timing discriminator produces two outputs, one going to pileup gate 63 and the other to delay circuitry 65.

Pileup gate 63 includes a flip flop and timing device for storing each input pulse for a selected period of time, for example about 350 nanoseconds. This period, that is the coincidence time, is set equal to or slightly longer than the clipped pulse width in the slow channel but less than the interval of delay provided at 17. If a second pulse enters during the coincidence time, an inhibiting output indicating a pileup is transmitted to gate driver 67. If no second pulse appears an inhibiting output is direted to gate driver 69. One suitable moduel that may be employed as pileup gate 63 is a model GP100/N available from EG&G, Inc.

The second timing discriminator output is delayed at 65 to be in phase with the pulse signal from fast channel splitter 39 and is then transmitted to one input of AND gate 71. The second input of AND gate 71 originates in splitter 39 and is amplified to a consistent level in pulse amplifier 75. A sorting discriminator 73 rejects all pulse signals below (and/or above) a certain pulse height that is knwon to be a limit on the spectrum of interest. In a sulfur analyzer, for instance, all pulse signals below about 3.5 MeV can be excluded. The sorted signal along with the timing pulse from delay 65 are sent to AND gate 71 to produce an output therefrom corresponding to each pulse of interest processed in the fast and slow channels. The AND gate 71 output is fed to both gate drivers 67 and 69 for generating output signals to gates 25 and 27 (also see FIG. 1) that are in phase with the pulse of interest passing through the processing channels 21 and 23. Either gate driver 67 and 69 is inhibited by the output of the pileup gate 63 such that only the appropriate gate 25 or 27 is enabled to connect either the slow or fast pulse processing channel to the pulse height analyzer 29.

A specific arrangement for driving the linear gates 43 and 45 (also see FIG. 2) is shown in FIG. 5. OR gates 77 and 79 are interposed within the inhibiting outputs of pileup gate 63 prior to gate drivers 67 and 69. Busy signals from the stretcher portions of linear gates 43 and 45 are also sent to OR gates 77 and 79 respectively to inhibit the gate drivers while a pulse is within the corresponding stretchers. The output of gate driver 69 (corresponding to the fast channel) is also fed back through OR gate 79 to inhibit a second interferring output. For instance, the processing of any pulse that follows within 100 nanoseconds of a preceding pulse can be eliminated in this manner. A similar feedback arrangement to gate driver 67 is unnecessary because pileup gate 63 inhibits pulse pileup in the slow channel. This arrangement in FIG. 5 prevents pulse distortion that may arise from interrupting a pulse while it is being processed.

The present invention provides a system and a method of minimizing pulse pileup distortion in nuclear radiation spectra. This is achieved without a large rejection of input pulse count and without serious loss of energy resolution from low signal to noise ratio produced by narrow pulse width clipping. This pulse processing system, used for monitoring the sulfur content of a continuos flow of coal sample, is capable of processing count rates of up to 300,000 counts per second with little or no loss in energy resolution. Count rates up to 500,000 counts per second have been obtained with acceptable loss in energy resolution. Numerous other applications for this improved system may also arise in well logging and process control within the minerals industry when good energy resolution is required at high count rates.

These and other advantages of the present invention are accomplished by separately processing the input pulse signal in a slow and in a parallel fast processing channel. The slow channel clips the pulse to a relatively long pulse width to adequately sample each pulse and thereby preserve good energy resolution in the subsequent plulse height analyzer. The fast channels clip each pulse to a relatively short pulse width to gain good separation of pulses which occur within a short time interval. A pulse pileup detector examines the input pulse signal prior to pulse processing and determines whether the slow or the fast channel is to be employed. Other features of the invention include components for stabilizing the gain across the pulse processing channels, for rejecting pulses outside the energy spectrum of interest, for preventing the interruption of a pulse during processing and for performing various other advantageous functions.

What is claimed is:

1. An improved pulse processing system for use in combination with a pulse height analyzer comprising:
    A. a first processing channel for shortenign input pulses to a first pulse width;
    B. a second processing channel in electrical parallel with said first channel for shortening input pulses to a second pulse width having a shorter duration than said first pulse width;
    C. pulse pileup detector means for selecting the output of said first channel during intervals of time having no pulse pileup and for selecting the output of said second channel during time intervals having pulse pileup and for transmitting said selected output to said pulse height analyzer D. electrical means for delaying said input pulse signal are connected to the input of said first and second pulse processing channels whereby said pulse pileup detector means is permitted preexamination of input pulse signals.

2. The improvement according to claim 1 wherein voltage source means for stabilizing the output of said first pulse processing channel is provided in combination with said pulse processing system.

3. The improvement according to claim 1 wherein first and second gates are connected to the corresponding outputs of both said first and said second processing channels, said gates being controlled by said pulse pileup means for selecting the output of either said first or said second processing channel.

4. The improvement according to claim 3 wherein pulse stretching means are provided within both said first and second gates to extend the output pulse width.

5. The improvement according to claim 4 wherein said pulse stretching means are each provided with a feedback output means for signaling said pulse pileup means whenever a pulse is present within the corresponding gate to prevent change of channels during a pulse signal.

6. The improvement according to claim 1 wherein said pileup detector includes pulse sorting means for accepting only those pulses having a pulse height within a preselected range of interest.

7. The improvement according to claim 1 wherein double delay line amplifiers are provided at the output of said first and second pulse processing channels to produce bipolar pulse signals to said pulse height analyzer.

8. A method of processing an input pulse signal to a pulse height analyzer comprising:
   a. transmitting said pulse signal in parallel to a pulse pileup detector, a first pulse processing channel and a second pulse processing channel;
   b. detecting whether more than one input pulse occurs within a preselected coincidence time to constitute pulse pileup and transmitting and output from said pulse pileup detector to each of said pulse processing channels in response thereto;
   c. clipping each pulse of said input pulse signal to a first pulse width within said first pulse processing channel;
   d. clipping each pulse of said input pulse signal to a second pulse width within said second pulse processing channel, said second pulse width being of shorter duration than said first pulse width; and
   e. transmitting the output of said first pulse processing channel to said pulse height analyzer when pulse pileup is not detected and the output of said second pulse processing channel to said pulse height analyzer when pulse pileup is detected.

9. The method of claim 8 wherein input pulses of less than a preselected pulse height threshold are rejected by both said first and second channels.

* * * * *